UNITED STATES PATENT OFFICE 2,615,894

N-HETERYLALKYL-ISOBUTYL-(2-THIENYL) ACETONITRILES AND PREPARATION THEREOF

Arlo Wayne Ruddy, Morristown, N. J., assignor to Sterling Drug Inc., New York, N. Y., a corporation of Delaware No Drawing. Application March 10, 1951, Serial No. 215,004

7 Claims. (Cl. 260—293.4)

This invention relates to new and useful compounds having the formula

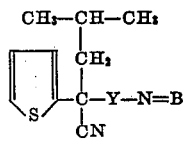

wherein Y is a straight chain lower alkylene radical having 2–3 carbon atoms and —N=B is a cyclic tertiary-amino group selected from the class consisting of piperidino, morpholino and pyrrolidino radicals; and to non-toxic salts thereof. This invention also relates to a process for preparing these new compounds.

The new N-heterylalkyl-isobutyl-(2-thienyl)-acetonitriles can be prepared by condensation of a metallo derivative of isobutyl-(2-thienyl)-acetonitrile with an N-heterylalkyl halide of the formula X—Y—N=B, where X is halogen and Y and —N=B have the meanings set forth above. The new compounds can also be prepared by condensation of a metallo derivative of an N-heterylalkyl-(2-thienyl)acetonitrile with an isobutyl halide. The intermediates are prepared by condensation of a metallo derivative of thienylacetonitrile with an isobutyl halide or an N-heterylalkyl halide. The metallo derivatives are compounds wherein an alpha-hydrogen of the thienylacetonitrile is replaced by a metal, and are preferably derived from alkali metals. They are prepared by treating the substituted acetonitrile with an excess of an alkali metalating agent such as sodium amide, sodium hydride, potassium amide, potassium tertiarybutoxide or sodium triphenylmethyl. The synthesis is summarized by the following equations using sodium amide as the metalating agent, and where X is halogen, preferably chlorine or bromine:

(1)

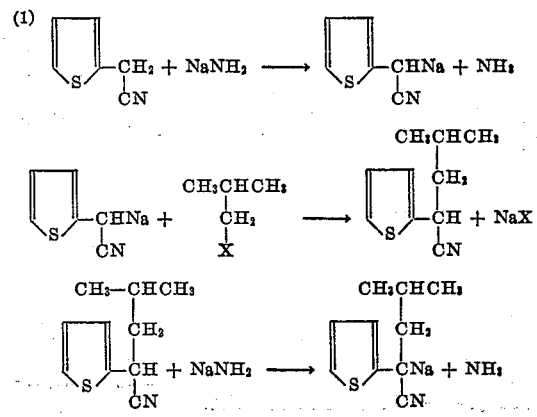

(2)

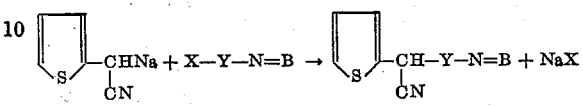

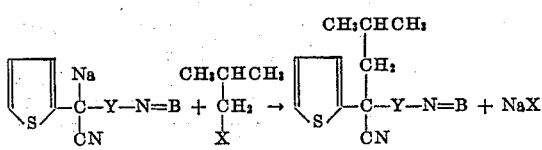

Equations (1) represent the complete sequence of reactions in which the alpha hydrogen atoms of thienylacetonitrile are substituted by an isobutyl group and then by an N-heterylalkyl group. Equations (2) are an abbreviated scheme showing introduction of the groups in reverse order. The initial condensation of thienylacetonitrile often is accompanied by some disubstitution due to the presence of two active hydrogen atoms in the molecule. For instance, condensation of sodio thienylacetonitrile with isobutyl halide gives some diisobutyl-thienylacetonitrile along with the desired isobutyl-thienylacetonitrile. The disubstituted product can be removed immediately as by careful fractionation or it can be carried along and separated at a later stage of the process.

In the last equation of Scheme 1 or the first equation of Scheme 2, the N-heteroalkyl halide (X—Y—N=B) can be reacted either as the free base or as an acid-addition salt. In the latter case sufficient excess metalating agent must be employed to take up the acid of addition.

These new compounds in the form of non-toxic, water-soluble salts are useful therapeutic agents, and are particularly useful as antispasmodic agents. They are also valuable as intermediates in the preparation of other useful pharmacodynamic agents. The non-toxic, water-soluble salts can be acid-addition salts or quaternary ammonium salts, derived respectively from reaction of the free basic nitrile with acids or esters. The acids which can be used to prepare the acid-addition salts are those which produce, when combined with the basic nitrile, salts whose anions are relatively innocuous to the animal organism in therapeutic doses of the salts, so that the beneficial physiological properties inherent in the base are not vitiated by any side effects ascribable to the anions. Suitable acid-addition salts are those derived from mineral acids such as hydrochloric acid, hydrobromic acid, hydriodic acid and sulfuric acid, and organic acids such as acetic acid, citric acid and tartaric acid. The quaternary ammonium salts are prepared by mixing the free base with lower-alkyl or aralkyl esters of a strong inorganic acid or organic sulfonic acid, preferably in an inert organic solvent such as benzene or ether, optionally with gentle heating. The salt either crystallizes immediately or can be obtained by concentration of the solvent. Examples of alkyl or aralkyl esters of inorganic acids or organic sulfonic acids which can be used to prepare quaternary ammonium salts of N - heterylalkyl - isobutyl - (2 - thienyl) - acetonitriles include methyl chloride, methyl bromide, methyl iodide, ethyl bromide, propyl chloride, benzyl chloride, benzyl bromide, methyl sulfate, methyl benzenesulfonate and methyl p-toluenesulfonate.

*Example*

(a) *Isobutyl - (2 - thienyl) acetonitrile.*—A suspension of 50 g. of sodium amide in 300 ml. of dry benzene was added in portions to a stirred mixture of 127.8 g. of (2-thienyl) acetonitrile and 142.5 g. of isobutyl bromide, while keeping the temperature at about 5° C. After the initial vigorous reaction appeared to be over, the mixture was gradually warmed to 55° C. and then allowed to stand at room temperature for about fifteen hours. Water was added, the layers were separated and the benzene layer was washed with water and dried over anhydrous sodium carbonate. The solvent was removed and the residue distilled through a Vigreaux column, collecting the material boiling at 78–85° C. (0.06 mm.). The distillate was refractionated through a column packed with glass helices, collecting the fraction boiling at 69–85° C. (0.05–0.2 mm.), $n_D^{25}=1.4972–1.5120$, comprising 92.1 g. of isobutyl-(2-thienyl) acetonitrile containing a small portion of diisobutyl-(2-thienyl) acetonitrile.

(b) *[2-(N - piperidyl) ethyl]-isobutyl - (2-thienyl) acetonitrile.*—A mixture of 92.1 g. of crude isobutyl-(2-thienyl) acetonitrile, obtained in part (a) above, 92 g. of N-piperidylethyl chloride hydrochloride, 50 g. of sodium amide and 400 ml. of benzene was gradually warmed with stirring. The mixture was heated at 60° C. for about two hours, cooled and slowly added to 200 ml. of water. The layers were separated, the water layer was extracted twice with ether and the combined ether extracts were washed twice with water. The combined organic layers were then extracted with dilute hydrochloric acid until acid to Congo red. The combined acid extracts were washed with ether and then made strongly alkaline with 35% sodium hydroxide. The liberated base was taken up in ether and dried over sodium hydroxide pellets. The solvent was removed and the residue fractionated, collecting the fraction boiling at 128–140° C. (0.05–0.07 mm.). Refractionation of the distillate gave 52.8 g. of [2-(N-piperidyl) - ethyl] - isobutyl-(2-thienyl) acetonitrile, B. P. 128–132° C. (0.04 mm.), $n_D^{25}=1.5140–1.5174$.

(c) A portion of the product obtained in part (b) (14.5 g.) was dissolved in excess alcoholic hydrogen chloride. Ether was then added causing precipitation of 15.3 g. of a crystalline solid, M. P. 181–183.5° C. Recrystallization from hot water gave 12.7 g. of the hydrochloride of [2-(N-piperidyl) ethyl]-isobutyl-(2-thienyl) acetonitrile, M. P. 190.5–192° C.

Anal. calcd. for $C_{17}H_{26}N_2S \cdot HCl$: N, 8.57; S, 9.81
Found: N, 8.42; S, 9.82

(d) A portion of the product obtained in part (b) (11.6 g.) was dissolved in dry benzene containing 8.5 g. of methyl iodide. Crystallization was induced by scratching and the mixture was allowed to stand for several days. The crystalline product was collected by filtration and washed with dry benzene giving 15.8 g. having the M. P. 130–132° C. Recrystallization from an ethyl acetate-methanol mixture gave 13.5 g. of a colored product, M. P. 134–135° C., which was in turn recrystallized from a minimum amount of hot water containing a trace of sodium bisulfite. A final recrystallization from ethyl acetate containing a small amount of methanol gave 11.2 g. of the methiodide of [2-(N-piperidyl) ethyl]-isobutyl-(2-thienyl) acetonitrile as colorless crystals, M. P. 136.5–138° C.

Anal. calcd. for $C_{18}H_{29}IN_2S$: I, 29.35; S, 7.42
Found: I, 29.17; S, 7.53

By the same method as that described above, but using isobutyl-(2-thienyl) acetonitrile and 3-(N-piperidyl) propyl chloride as reactants, [3-(N-piperidyl) propyl]-isobutyl - (2 - thienyl) acetonitrile and its salts are prepared.

Using isobutyl-(2-thienyl) acetonitrile and 2-(N-pyrrolidyl) ethyl chloride as reactants, [2-(N-pyrrolidyl) ethyl]-isobutyl-(2-thienyl) acetonitrile and its salts are prepared.

Using isobutyl-(2-thienyl) acetonitrile and 3-(N-pyrrolidyl) propyl chloride as reactants, [3-(N-pyrrolidyl) propyl]-isobutyl-(2-thienyl) acetonitrile and its salts are prepared.

Using isobutyl-(2-thienyl) acetonitrile and 2-(N-morpholinyl) ethyl chloride as reactants, [2-(N - morpholinyl) ethyl]-isobutyl-(2-thienyl) acetonitrile and its salts are prepared.

Using isobutyl-(2-thienyl) acetonitrile and 3-(N-morpholinyl) propyl chloride as reactants, [3-(N - morpholinyl) propyl] - isobutyl-(2-thienyl) - acetonitrile and its salts are prepared.

I claim:

1. A member of the group consisting of (a) an N - heterylalkylisobutyl - (2 - thienyl) acetonitrile having the formula

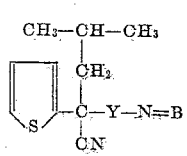

wherein Y is a straight chain lower alkylene radical having 2-3 carbon atoms and —N=B is a cyclic tertiary-amino group selected from the class consisting of piperidino, morpholino and pyrrolidino radicals; and (b) non-toxic, water-soluble salts thereof.

2. [2 - (N - piperidyl) ethyl] - isobutyl - (2-thienyl) acetonitrile having the formula

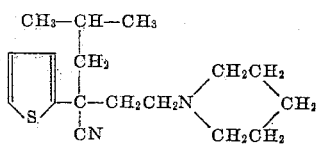

3. The hydrochloride of [2 - (N - piperidyl) - ethyl]-isobutyl-(2-thienyl) acetonitrile.

4. The methiodide of [2-(N-piperidyl) ethyl]-isobutyl-(2-thienyl) acetonitrile.

5. A method for preparing an N-heterylalkyl-isobutyl-(2-thienyl)acetonitrile having the formula

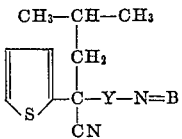

wherein Y is a straight chain radical having 2-3 carbon atoms and —N=B is a cyclic tertiary-amino group selected from the class consisting of piperidino, morpholino and pyrrolidino radicals, which comprises heating a metallo derivative of isobutyl-(2-thienyl)acetonitrile with an N-heterylalkyl halide of the formula X—Y—N=, wherein X is halogen.

6. A method for preparing [2-(N-piperidyl)-ethyl]-isobutyl-(2-thienyl)acetonitrile which comprises heating a metallo derivative of isobutyl-(2-thienyl)acetonitrile with a 2-(N-piperidyl)ethyl halide.

7. A method for preparing [2-(N-piperidyl)-ethyl]-isobutyl-(2-thienyl)acetonitrile which comprises heating the sodio derivative of isobutyl-(2-thienyl)acetonitrile with 2-(N-piperidyl)ethyl chloride.

ARLO WAYNE RUDDY.

REFERENCES CITED

The following references are of record in the file of this patent:

UNITED STATES PATENTS

| Number | Name | Date |
|---|---|---|
| 2,425,721 | Blicke | Aug. 19, 1947 |
| 2,541,634 | Blicke | Feb. 13, 1951 |
| 2,561,385 | Leonard | July 24, 1951 |
| 2,561,899 | Adamson | July 24, 1951 |